United States Patent [19]

Kassai

[11] Patent Number: 4,741,056
[45] Date of Patent: May 3, 1988

[54] BABY CARRIAGE SEAT EXTENSION MEMBER

[75] Inventor: Kenzou Kassai, Osaka, Japan

[73] Assignee: Aprica Kassai Kabushikikaisha, Osaka, Japan

[21] Appl. No.: 37,107

[22] Filed: Apr. 10, 1987

Related U.S. Application Data

[63] Continuation of Ser. No. 742,888, Jun. 10, 1985, abandoned.

[30] Foreign Application Priority Data

Jul. 16, 1984 [JP] Japan .......................... 59-108056[U]

[51] Int. Cl.⁴ .................. B62B 7/06; B62B 9/12; A47D 13/02
[52] U.S. Cl. ........................... 5/99 A; 5/101; 5/102; 280/47.4; 280/643; 280/648; 297/118
[58] Field of Search ............. 5/99 R, 99 A, 101, 102, 5/103, 104, 105, 106, 107, 93, 97, 98, 94; 280/47.38, 47.4, 643, 642, 648, 644; 297/433, 118

[56] References Cited

U.S. PATENT DOCUMENTS

| 367,935 | 8/1887 | Savene | 280/47.4 |
|---|---|---|---|
| 586,760 | 7/1897 | Crandall | 280/47.4 |
| 647,165 | 4/1900 | Stead et al. | 280/47.4 |
| 676,741 | 6/1901 | Flannery | 280/642 |
| 745,619 | 12/1903 | Huber | 280/642 |
| 1,576,075 | 3/1926 | Tisdell | 280/643 |
| 1,658,208 | 2/1928 | Rakofsky | 280/47.4 |
| 2,781,225 | 2/1957 | Heideman | 280/47.4 |
| 2,805,076 | 9/1957 | Thomas | 280/643 |
| 2,872,203 | 2/1959 | Hedstrom | 280/47.4 |
| 3,115,364 | 12/1963 | Berlin | 5/94 X |
| 3,309,101 | 3/1967 | Romay | 280/47.38 |
| 4,118,052 | 10/1978 | Cabagnero | 280/642 |
| 4,181,356 | 1/1980 | Fleischer | 5/99 R X |
| 4,411,472 | 10/1983 | Kassai | . |
| 4,597,116 | 7/1986 | Kassai | 5/99 A |
| 4,602,395 | 7/1986 | Kassai | 5/93 R |
| 4,616,371 | 10/1986 | Kassai | 5/99 A |

FOREIGN PATENT DOCUMENTS 472841 10/1937 United Kingdom .................... 5/98

Primary Examiner—Alexander Grosz
Attorney, Agent, or Firm—W. G. Fasse; D. H. Kane, Jr.

[57] ABSTRACT

A baby carriage seat extension member has a U-form frame (5) with rear or free end portions (4) adapted to be removably attached to the front end portions of a pair of handrails (3) disposed on both sides of the seat (2) of a baby carriage. The frame extends horizontally and supports a front wall (8) and right and left lateral walls (10, 9) having upper edges attached to the frame. A bottom wall is connected to the lower edges of the front wall (8) and of the two lateral walls (10, 9). The bottom wall is longer than the side walls so that the bottom wall covers a substantial portion of the seat surface (11) of the baby carriage seat.

3 Claims, 5 Drawing Sheets

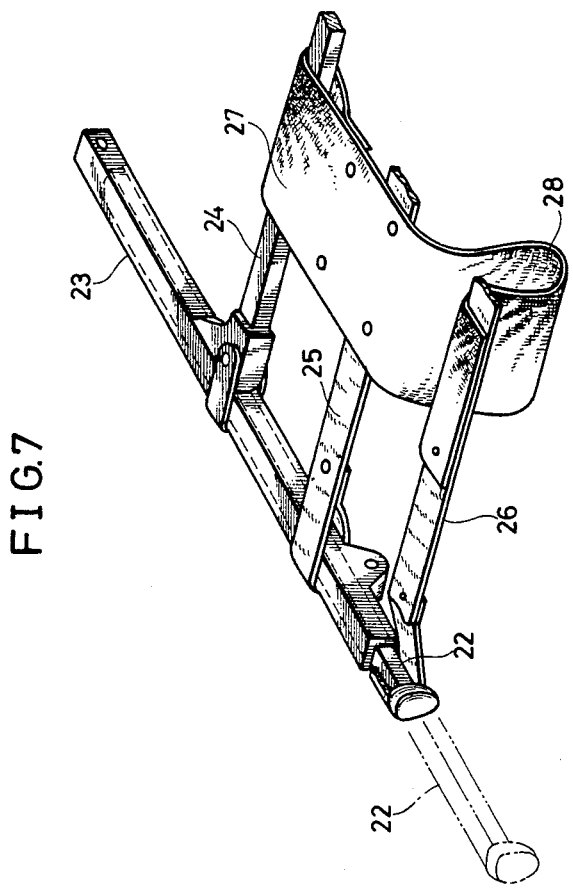

BABY CARRIAGE SEAT EXTENSION MEMBER

This application is a continuation of application Ser. No. 742,888, filed June 10, 1985, now abandoned.

BACKGROUND OF THE INVENTION

This invention relates to a baby carriage seat extension member and particularly to a seat extension member adapted to be connected to the front of a seat to change the latter into a bed form.

An arrangement for forwardly extending the seat of a baby carriage is disclosed in Japanese Patent Publication No. 32067/1983 (corresponding to U.S. Pat. No. 4,411,472). It has a seat extension section which, when a slider is pulled forwardly, is raised while a portion of the slider is contacting the lower surface of the seat extension section, so that the seat extension section is substantially horizontally extended. The seat extension section thus horizontally extended forms a forward extension of the seat surface of the seat proper.

Such a seat makes the backrest reclinable, so that the seat can be used as a bed when the backrest is lowered whereby the seat and extension section become effective as a bed. That is, the seat extension section will form one end portion of the horizontal portion of the bed. The seat having such prior art seat extension section is advantageous in that the seat surface can be extended in a simple operation.

Although the aforesaid type of seat can be changed into a simple type of bed as needed, this is inferior to the so-called "box-type" seat which is more comfortable and provides a better safety for a baby. A "box-type" seat is in the form of a complete upwardly open box and a baby lying on the bottom is completely surrounded with walls on four sides. Thus, no matter how vigorously the baby may move in the seat, there is, in most cases, no possibility of the baby falling off the bed. However, in the case of the aforesaid type of seat, when it is changed into a bed form, the region of the bed around the baby's feet remains open. Even though the surface of the bed can be fairly wide and horizontally there is still the possibility of falling out.

Further, when the aforesaid type of seat is changed into a bed form, there is produced a difference in level, more or less, between the upper surface of the seat extension section and the seat surface of the seat proper. Such difference in level is uncomfortable to the baby and should be as small as possible.

SUMMARY OF THE INVENTION

This invention is intended to solve the problem inherent in a seat which can be changed into the aforesaid simple type of bed form, that is, the problem that it is inferior to the so-called "box-type" seat.

According to this invention, there is provided a seat extension member which is used in combination with the seat proper of a baby carriage and which is a component separate from the seat. This seat extension member is removable and can be attached to the seat of a baby carriage as needed.

More particularly, the present seat extension member comprises a frame extending substantially horizontally in U form and having rear end portions adapted to be attached to the front end portions of a pair of handrails disposed on both sides of the seat of a baby carriage. Extending downwardly from said frame are a front wall and right and left lateral walls with their upper edges attached to said frame. A bottom wall is connected to the lower edges of said front wall and the two lateral walls while having a length longer than said side walls to cover at least a substantial portion of the seat surface of the seat.

When the seat extension member of this invention is attached to the pair of handrails, there are formed a front wall and right and left lateral walls, whereby a seat of the so-called "box-type" is formed having a closed periphery when it is combined with the seat portion proper.

According to this invention, there is provided a removable seat extension member which can be handled separately from the seat of a baby carriage and combined with the seat as needed. Since this seat extension member has a front wall, a right lateral wall, and a left lateral wall, and a bottom wall, the seat can be changed into an almost complete box type bed when it is combined with the seat proper in its reclined state. Further, since the bottom wall of the seat extension member extends to cover at least a portion of the seat surface of the seat, formation of a clearance or difference in level between the seat extension member and the seat proper is prevented, so that a desirable comfortableness is provided for the baby. Further, such seat extension member can be sold as a part for baby carriages separately from the baby carriage body. Thus, by adding such a seat extension member to the baby carriage a consumer's requirement may be satisfied even after purchase of the baby carriage to the same effect as if such an arrangement had been an original component of the baby carriage. Further, for a consumer who, for example, wishes to have a little more cushioning in the seat surface of the seat of the baby carriage, a seat extension member having a cushioned bottom can be provided. Since the seat extension member of the invention can be removed from the body of the baby carriage, it can be easily washed should it have become soiled.

These objects and other objects, features, aspects and advantages of the present invention will become more apparent from the following detailed description of the present invention when taken in conjunction with the accompanying drawings.

BRIEF DESCRIPTION OF THE DRAWINGS

FIG. 7 is a fragmentary perspective view showing a drawer rod and its related arrangement employed in the baby carriage shown in FIGS. 2 and 3.

DETAILED DESCRIPTION OF THE PREFERRED EMBODIMENTS AND OF THE BEST MODE OF THE INVENTION

Figure 1:
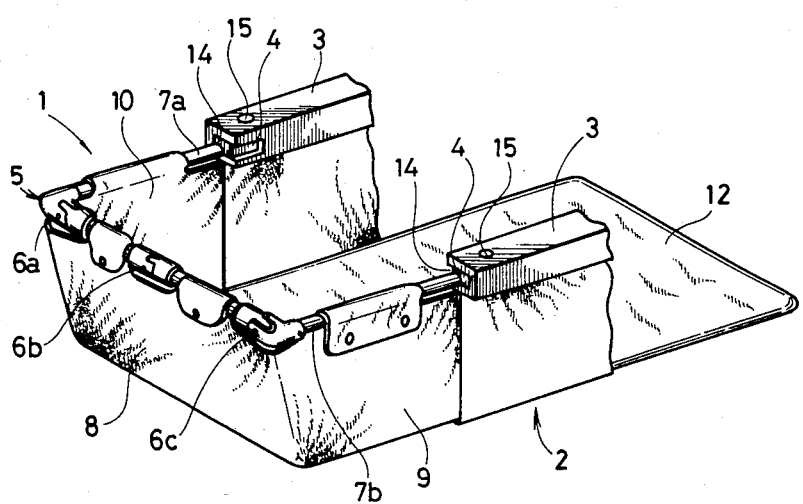
FIG. 1 is a perspective view showing a seat extension member according to an embodiment of the invention with a portion of the seat of a baby carriage.
Figure 2:
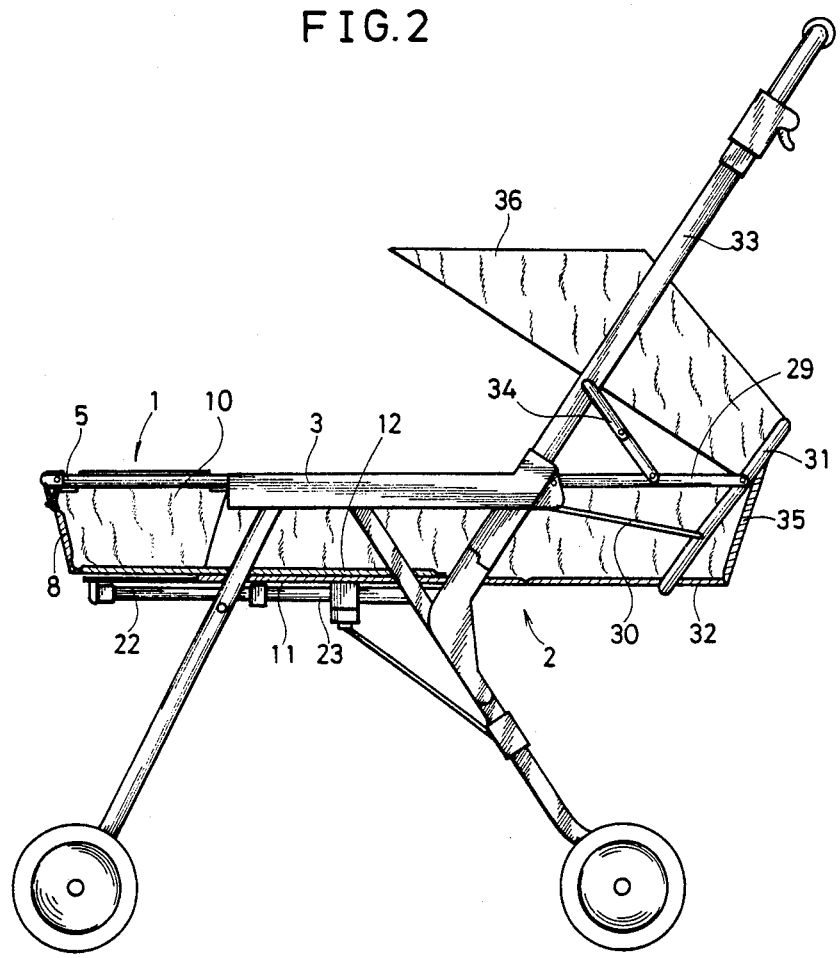
FIG. 2 is a side view of the baby carriage having the seat extension member attached thereto.

FIG. 1 is a perspective view showing an embodiment of this invention attached to the seat proper of a baby carriage. By attaching the seat extension member 1 to the seat 2 of the baby carriage the latter is changed into a bed form as shown in FIG. 2.

The seat extension member 1 comprises a frame 5 having rear end portions 4 adapted to be removably attached to the front end portions of a pair of handrails 3 disposed on both sides of the seat 2 of the baby carriage. When in its attached state, the frame 5 extends substantially horizontally and in U form. The frame 5 comprises foldable connecting portions 6a, 6b and 6c, whereby the U-shaped frame can be folded in such a manner that left-hand and right-hand sides 7a and 7b move toward each other. Such arrangement is provided in order to allow the pair of handrails 3 to have their spacing from each other reduced since the folding of the baby carriage shown in FIG. 2, which is of the foldable type, involves a widthwise contracting movement of the baby carriage.

A front wall 8, a left-hand lateral wall 9, and a right-hand lateral wall 10 extend downwardly from the frame 5, with their upper sides defined by said frame 5. A bottom wall 12 is connected to the lower sides of the front wall 8 and lateral walls 9 and 10 and extends to cover at least a front portion of the seat surface 11 of the seat 2.

Figure 3:
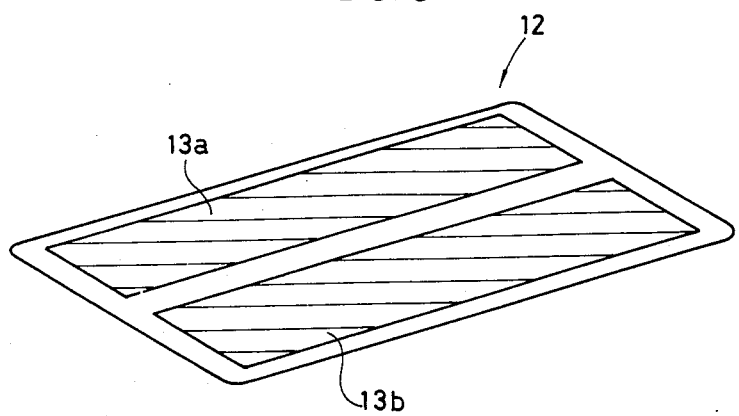
FIG. 3 is a diagrammatic view showing the disposition of cores and inserted in the bottom wall of the seat extension member.

The front wall 8, lateral walls 9 and 11 and bottom wall 12 are sewn of suitable cloth. In FIG. 2, the walls of the seat extension member 1 and seat 2 disposed on this side facing the viewer are removed, and suitable cores may be inserted in the front wall 8 and bottom wall 12 to impart a suitable degree of "stiffness" thereto. FIG. 3 shows the inserting of cores 13a and 13b extending longitudinally into the bottom wall 12. Two cores are disposed in side-by-side parallel relation. Thus, a foldable region is defined between the two cores 13a and 13b for accommodating the transverse contraction which is produced during the folding of the baby carriage. In addition, the bottom surface 12, which serves as a surface to support the weight of a baby, may have a cushioning material inserted therein as needed.

In FIG. 2, the bottom wall 12 is not long enough to reach the rear end of the seat surface 11 of the seat 2 lowered into a bed form. This length of the seat extension member still facilitates the handling of the seat extension member 1 without increasing its size too much. Thus, the bottom wall 12 may be further extended rearwardly to cover the whole of the seat surface 11 of the seat 2.

Figure 4:
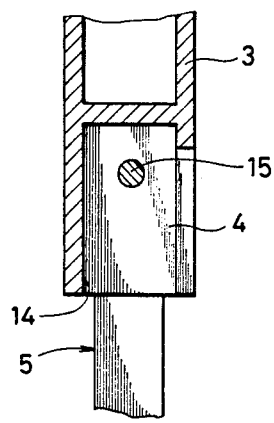
FIG. 4 is a plan view, partly in section, showing how the rear end portions of the frame of the seat extension member 1 are attached to handrails.

The rear end portions 4 of the frame 5 are inserted into forward openings 14 formed in the handrails 3 and are fixed therein. FIG. 4 shows the relationship between the rear end portion 4 and the handrail 3, the latter being shown in section.

Referring to FIGS. 1 and 4, the rear end portions 4 of the frame 5 are inserted in the openings 14 in the handrails 3 are held in place by attaching pins 15 passing through the hand rails and through the end portions, whereby the frame 5 is fixed to the handrails 3. The attaching pins 15 can be pulled out as needed, so that the frame 5 can be easily removed from the handrails 3 by hand.

Figure 5:
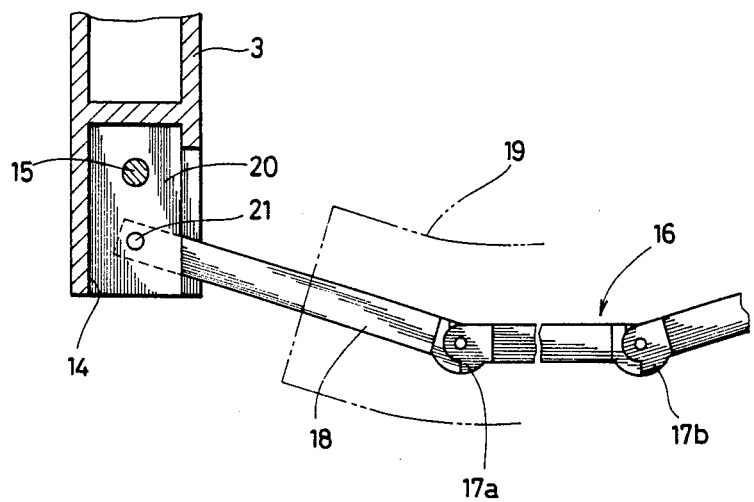
FIG. 5 is a plan view, partly in section, showing how a torso guard is attached by utilizing the same handrails.

The openings 14 in the handrails 3 are also used for attaching the torso guard 16 shown in FIG. 5. The torso guard 16 is attached between the handrails 3 in place of the seat extension member 1 when the latter is removed when the seat 2 of the baby carriage is changed into a chair form. The torso guard 16 has a mandrel 18 having foldable portions 17a and 17b adapted to make it foldable in accordance with the folding of the baby carriage, said mandrel being covered with an elastic cover 19. Each end of the mandrel 18 has an attaching block 20 turnably attached thereto by a pivot pin 21. The attaching blocks 20 have substantially the same outer size as the rear end portions 4 of the frame 5. Thus, after the frame 5 has been pulled out of the handrails 3, the attaching blocks 20 can be inserted in the openings 14 and fixed therein by the attaching pins 15. In addition, the openings 14 are each open along a region extending from the front surface to an inner lateral surface of the handrail 3, whereby, the mandrel 18 of the torso guard 16 can be extended from the inner lateral surfaces of the handrails 3. Another method of attaching the torso guard 16 to the handrails 3, involves passing the attaching pins 15 directly through the ends of the mandrel 18 without using the attaching blocks 20.

In this embodiment, an auxiliary support is provided for the bottom wall 12 in the form of drawer links 22 supporting the bottom wall 12 from below when the seat extension member 1 is attached, as shown in FIG. 2.

Drawer links 22 as shown in FIG. 7 are constructed as a pair and inserted in a pair of longitudinally extending pipe members 23 provided in the body of the baby carriage and are slidably held therein. A foldable widthwise connecting rod 24 and a first widthwise connecting belt 25 are connected between the pipe members. Further, a second widthwise connecting belt 26 is connected between the front ends of the drawer links 22. A wide belt 27 is disposed parallel to and between the pipe members 23 and interconnects the widthwise connecting rod 24 and first and second widthwise connecting belts 25 and 26. The widthwise connecting rod 24, the widthwise connecting belts 25 and 26 and the wide connecting belt 27 contact the lower surface of the seat surface 11 of the seat 2 for supporting the seat surface 11. The state shown in solid lines in FIG. 7 is a state in which the drawer links 22 are at their rearmost position, with a slack 28 formed in the wide belt 27. When the drawer links 22 are forwardly withdrawn as shown in phantom lines in FIG. 7, the slack 28 disappears, whereby the extent of forward withdrawal of the drawer links 22 is defined.

Figure 6:
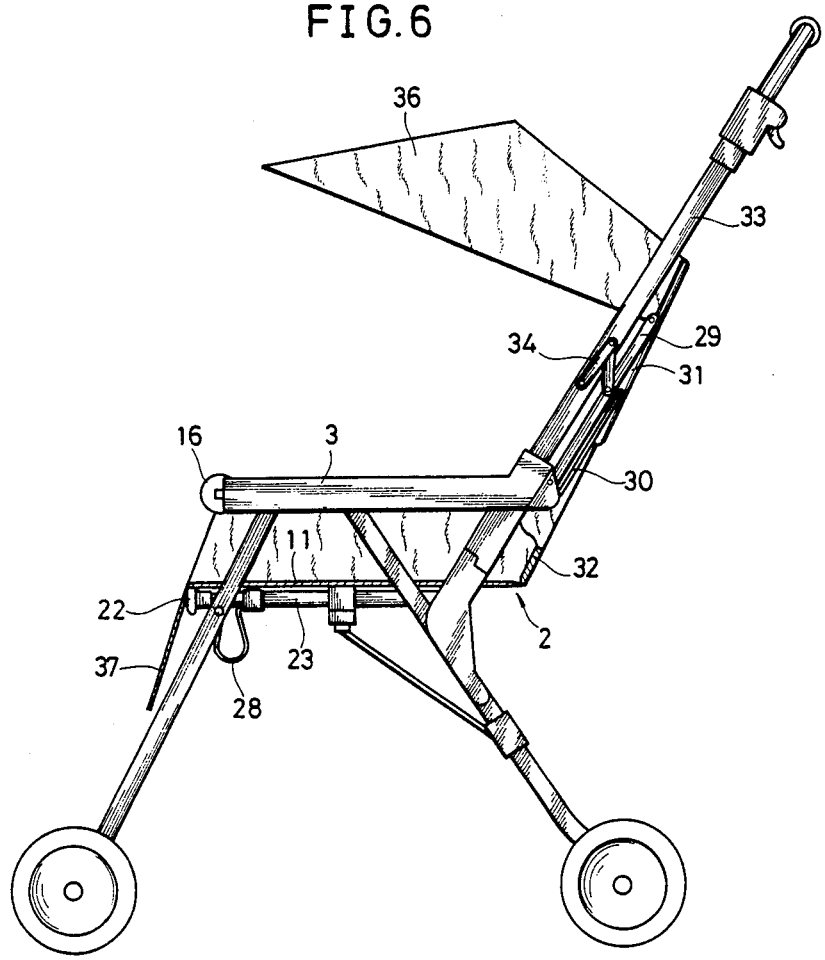
FIG. 6 shows the seat 2 of the baby carriage changed into a chair form by removing the seat extension member from the baby carriage shown in FIG. 2.

Referring principally to FIGS. 2 and 6, the method of using the seat 2 of the baby carriage in connection with the seat extension member 1 will now be described.

In FIG. 2, the seat 2 is combined with the seat extension member 1 to form a bed. The rear portion of the seat 2 is held by rear seat portion support members 31 which are held by main and auxiliary levers 29 and 30 which are turnably supported on the rear ends of the handrails 3, and the backrest 32 is allowed to lie horizontally. The main levers 29 in such a state are held by reclining adjusting links 34 which are connected to respective push rods 33. The reclining adjusting links 34 are adapted to have their bend state changed so as to change the inclined state of the main levers 29. A head guard 35 connected to and extending from the backrest 32 is held by the rear seat portion support members 31 and forms a rising wall surface. Further, a hood 36 may be attached by utilizing the rear seat portion support members 31.

On the other hand, the seat extension member 1 is positioned to supplement the front portion of the seat 2 thus changed into a bed from. When withdrawn to their foremost position, the drawer links 22 support the seat extension member 1 from below.

FIG. 6 shows the state of the seat 2 of the baby carriage changed into a chair form. In this state, the backrest 32 of the seat 2 is raised, whereby the reclining adjusting links 34 are bent, and whereby the main levers 29 are raised. In response thereto, the rear seat portion support members 31 are upwardly displaced and the backrest 32 is raised. In this state, though not shown in FIG. 6, the head guard 35 is aligned with the backrest 32 and forms a portion of the backrest 35.

On the other hand, in the front portion of the seat 2, the seat extension member is removed and instead the torso guard 16 is attached, while the drawer links 22 are retracted into the pipe members 23. In this embodiment, a depending portion 37 formed as an extension of the seat surface 11 hangs down in response to the retraction of the drawer links 22.

The description has so far been given with reference to the illustrated embodiment, but the drawer links 22 and their related arrangement are supplementarily provided, not being an essential requirement in holding the seat extension member 1.

Further, the use of the extension member 1 is not limited to the type of baby carriage illustrated. That is, the invention is applicable to any type of baby carriages provided that a pair of handrails or members having a shape corresponding to handrails are formed. It is also not required that such a baby carriage is a foldable baby carriage.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A baby carriage, comprising a frame structure including a pair of handrails forming arm rests each having a forward opening therein, a baby holding body member including a supporting member having a plurality of sections foldably interconnected and forming a seat and backrest changeable into a bed bottom and head wall and vice versa, said supporting member being attached to said frame structure, a separate seat extension member being separable from and forming a box type baby carriage bed in cooperation with said baby holding body member, said separate seat extension member comprising a U-shaped extension frame having rear end portions, means for removably attaching said rear end portions of said U-shaped extension frame to front end portions of said pair of handrails disposed on both sides of and laterally above said seat of said baby carriage, said means for removably attaching comprising manually outwardly removable pins passing through said handrails and through said rear end portions of said U-shaped extension frame when said rear end portions are inserted in said forward openings formed in said arm rests, said U-shaped extension frame extending substantially horizontally, and a separate extension body being separable from said supporting member and including a front wall, a right lateral wall and a left lateral wall having upper edges secured to said U-shaped extension frame, and a bottom wall connected to said lower edges of said front wall and of said two lateral walls, said separate seat extension member with its extension body being removable as a unit from said baby holding body member, said bottom wall of said extension body having a length substantially longer than said two lateral walls, a portion of said bottom wall overlapping a substantial portion of said seat forming said bed bottom of said baby holding body member of said baby carriage, said overlapping portions forming a double bottom at least where a firm support for a baby's back is needed, and core means inserted into said bottom wall of said extension body for providing a cushioning effect.

2. The baby carriage of claim 1, wherein said forward openings in said handrails also serve as openings for receiving opposite ends of a torso guard adapted to be connected beween the handrails.

3. The baby carriage of claim 1, wherein said U-shaped frame has an intermediate portion between said rear end portions, means as part of said intermediate frame portion for folding said frame into a folded condition, said core means inserted into said bottom wall comprising two separate longitudinal core sections having a foldable bottom wall portion between said core sections for permitting said folding of said frame.

* * * * *